United States Patent Office 3,044,745
Patented July 17, 1962

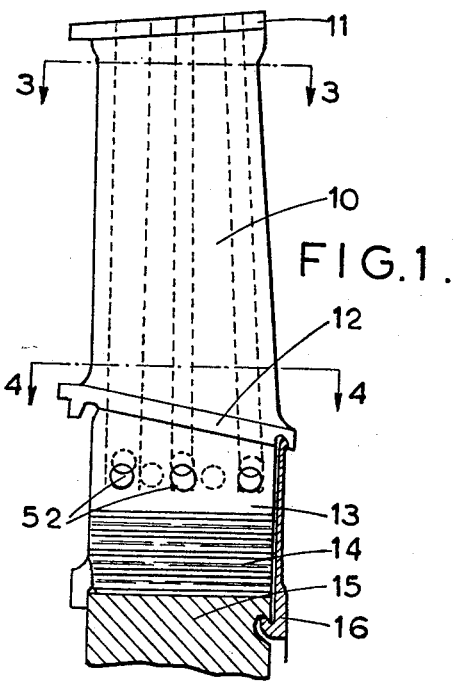
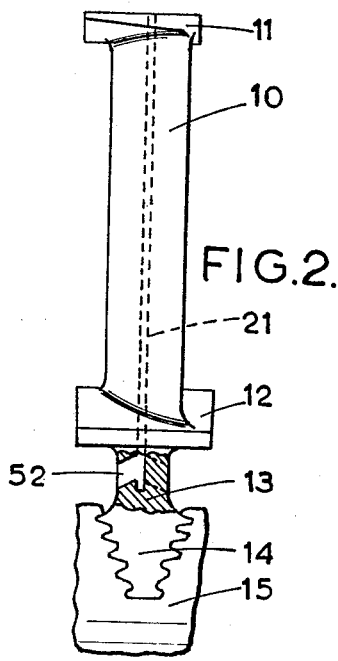
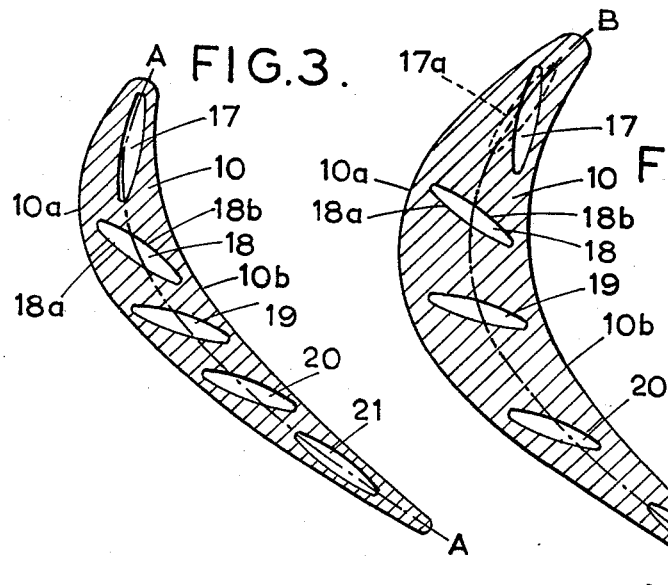

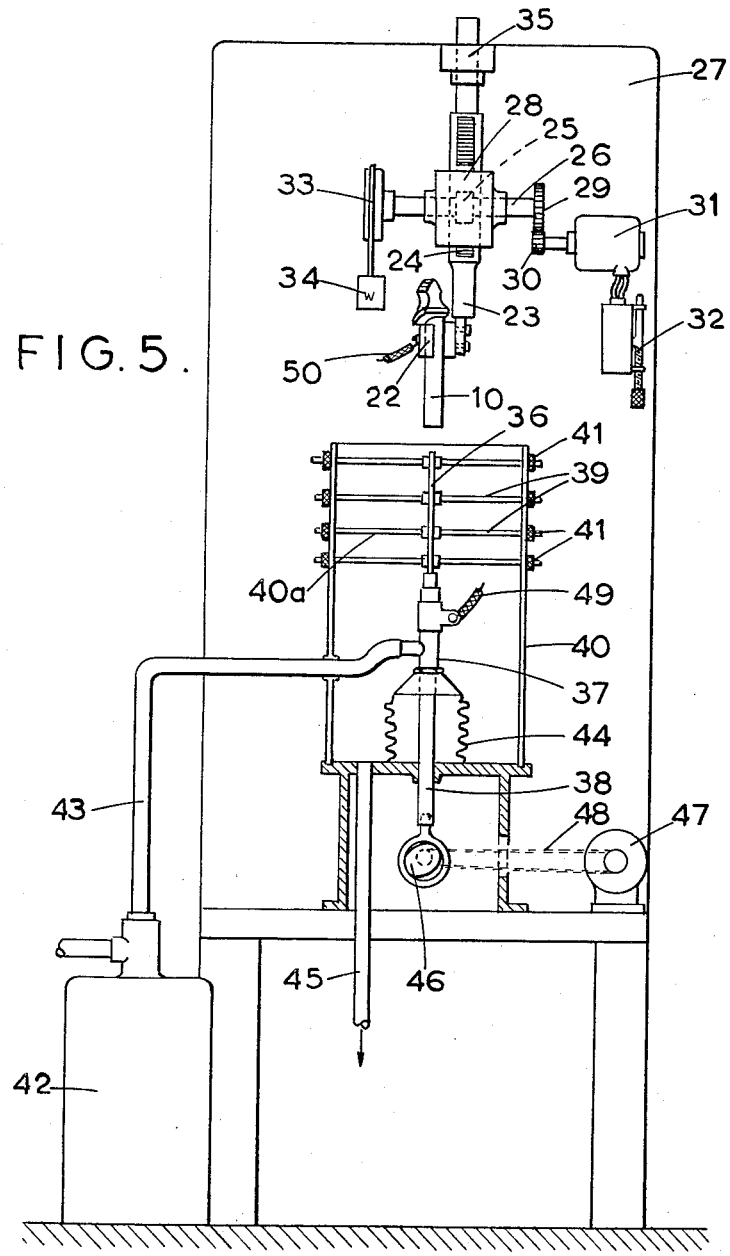

3,044,745
TURBINE AND COMPRESSOR BLADES
Frank Henry Stark, Chellaston, England, assignor to Rolls-Royce Limited, Derby, England, a British company
Filed Nov. 19, 1957, Ser. No. 697,494
Claims priority, application Great Britain Nov. 20, 1956
3 Claims. (Cl. 253—39.15)

This invention relates to turbine and compressor blades such as used in internal combustion turbine engines. Such blades may have passageways running axially of the blade for the flow of cooling and/or heating fluid such as air.

In order to use the fluid efficiently it is desirable to make the passageways with a cross-section of flattended or lenticular form, and hitherto blades having such passageways have been manufactured by forging or extrusion processes.

According to the present invention a turbine or compressor blade is formed with passageways extending axially of the blade for the flow of cooling and/or heating fluid, one or more of said passageways being of flattened elliptical or lenticular cross-section and being formed by an electrical drilling process to have its major axis disposed at a substantial angle to the camber line of the blade. Preferably such a passageway is formed to extend from a point adjacent the convex surface of the blade to a point adjacent the concave surface thereof.

Electrical drilling processes used for the manufacture of blades in accordance with the present invention may include processes involving the removal of metal by electric spark action, by electric anodic action, or by electric arc erosion of disintegration.

In accordance with a further feature of the invention another of the passageways can be flattened elliptical or lenticular cross-section and formed adjacent the trailing edge of the blade, the major axis of said passageway lying substantially parallel to the camber line of the blade; such a passageway may be formed by an electrical drilling process or may be formed by an extrusion or forging process in known manner. If desired at least one of the passageways can be formed adjacent the leading edge of the blade and such passageway may have any desired cross-section, for example circular (in which case it may be formed by normal drilling or an electrical drilling process) or for example it may be of lenticular or flattened elliptical form (in which case it may be formed by a forging or extrusion process or alternatively by an electrical drilling process).

It will be appreciated that in a blade which has hitherto been produced by a forging or extrusion process to have passageways of flattened elliptical or lenticular cross-section, the disposition of the major axes of the passageways has been defined by the requirements of the process employed, and since the forging or extrusion takes place substantially transversely to the camber line of the blade, such major axes lie substantially parallel to said line.

Passageways in blades according to the present invention may be formed for example by the electric arc disintegration process as described and claimed in U.S. Patent No. 2,972,182, in which an electric arc drill of a shape corresponding to the shape of the desired passageway is passed progressively through the blade as the passageway is formed and is reciprocated relative to the blade whereby arcs are created between the drill and blade in the presence of a stream of electrolytic liquid flowing through a hollow formation in the drill.

Passageways in blades according to the present invention may be of twisted form whereby any one may retain the same disposition relative to the external profile of the blade substantially throughout its length, such a twisted passageway may be formed by a helical drill which is twisted the requisite amount relative to the blade during the electrical drilling process.

Blades manufactured in accordance with the present invention present the following advantages:

(1) The method of drilling by the electrical drilling process permits passageways to be formed having a high axis ratio, whilst the major axis or one or more holes can be disposed in accordance with the invention by suitable disposition of the electrode drills relative to the camber line of the blade.

(2) As a result fewer passageways may be used facilitating the introduction of the fluid into the passageways and further simplifying production of the blade.

(3) Since the major axes of the passageways may be disposed according to choice, a more uniform temperature can be obtained throughout the blade. The disposition and number and shape of the cooling air holes may be selected to give a substantially uniform temperature of the blade metal throughout the section.

(4) The blade can be close forged to the desired shape before the holes are drilled.

One embodiment of the invention is illustrated in the accompanying drawings in which;

FIGURE 1 is an elevation of a turbine blade;
FIGURE 2 is a view of the same blade in the direction at right angles ot FIGURE 1;
FIGURES 3 and 4 are sections on the line 3–3 and 4–4 respectively of FIGURE 1, and
FIGURE 5 is an elevation of apparatus for drilling the holes in the blade.

FIGURES 1 to 4 illustrate the complete blade which has a blade portion proper 10, of airfoil form, a tip shroud 11, a platform 12, a shank portion 13 and a root fixing member such as the fir-tree fixing portion 14 fitting into slots on the turbine disc 15. Gaps between the shank portions of adjacent blades are closed on one side of the disc by a plate member 16.

Passing axially through the blade portion and into the shank portion of the blade are cooling passageways 17, 18, 19, 20 and 21. It will be noted that the passageways are of flattened or lenticular form, the major axes of such passageways, with the exception of those of the passageways 17 and 21, lying at a substantial angle to the median camber line A—A at the tip of the blade.

It will be noted in FIGURE 4 that the passageway 17 additionally lies at a substantial angle to the camber line B—B. If desired such passageway 17 may be of twisted form so that its major axis lies on the median camber line B—B as indicated by dotted lines at 17a. Such a twisted passageway may be formed by the use of a twisted drill in accordance with the process described with reference to FIGURE 5.

Thus by way of example the side faces 18a, 18b of passageway 18 substantially face the convex and concave surfaces 10a, 10b respectively of the blade profile, whilst the passageway extends from a point adjacent the surface 10a to a point adjacent the surface of 10b.

It will be observed by reference to FIGURES 3 and 4 that the pattern of the passageways within the blade section changes from tip to root, the passageways being splayed outwards towards the root; such a disposition providing improved cooling of the blade is permitted by the adoption of the present invention.

The passageways may be formed by the apparatus illustrated in FIGURE 5.

The blade 10 is mounted tip downwards in a carrier 22 which is caused gradually to travel downwards by a shaft 23 to which the carrier is bolted and which has a rack engaged by a pinion 25 carried by a shaft 26 supported in bearings from fixed structure 27 by a casing 28. Shaft 26 carries on one end a pinion 29 which is driven by a pinion 30 from an electric motor 31 the speed of which is controlled by a speed control 32. On the other end of shaft 26 is a pulley 33 carrying a weight 34 which helps to hold the blade 10 steady. The electric motor drive causes the blade to descend at the rate of 0.02 to 0.08 inch per minute. An extension upward of shaft 23 slides through a bearing 35 supported from the fixed structure 27 and guides the shaft 23 vertically.

A hollow tubular drill 36 is carried by a shaft 37 in a bearing 38 from the fixed structure. The drill is further supported by a series of X shaped rods 39 from an upright cylinder 40 to which they are located by nuts 41. The rods at their point of intersection carrying ring bearings 40a which support slidably the drill. The rods can be removed in turn as the drill passes further into the hole which it is forming in the blade. A sodium silicate or other suitable electrolytic solution is fed by compressed air from a tank 42 through pipe 43 to the hollow interior of shaft 37 whence it passes up through the hollow drill washing away the disintegrated debris and cooling the drill and blade at the point of disintegration thereafter it flows down between the drill and the walls of the hole to insulate the drill from the blade, the liquid passes from the cylinder 40 through escape pipe 45. The insulation of the side faces of the drill from the blade material is further increased by the formation of an anodic film which is not broken down by the reciprocation of the drill. At the bottom of shaft 37 an eccentric or crank 46 driven from a motor 47 through belt 48 causes the shaft 37 to be reciprocated or vibrated at a frequency from 3000 to 4000 cycles per minute.

A direct current or an alternating current superposed on a direct current is passed from lead 49 and drill 36 across the arc gap between drill and blade through the blade 10, holder 22 and lead 50. Satisfactory drilling has been obtained using a voltage of between 6 and 24 giving rise to a maximum current of the order of 100 amps.

When the holes have been drilled in this way further drillings 52 (see FIGURE 2) are made through the shank portion 13 of the blade to connect with the base of the holes.

It will be observed by reference to FIGURES 3 and 4 that the hole pattern changes from the tip to root sections, the holes being splayed outwards towards the root. Such an arrangement is possible by adoption of the present invention, not readily being obtained in the previously adopted methods in which the passages are formed by forging and/or extrusion.

The invention is particularly suitable for rotor turbine blades but may also be used for stator blades commonly known as nozzle guide vanes.

Whilst in the embodiment described it is intended that all the passageways, with the possible exception of passageway 21, are formed by an electrical drilling process. It will be appreciated that in alternative arrangements certain of the passageways for example that at the leading edge and trailing edge, may be formed by an extrusion or forging process. Likewise the passageways at the leading and trailing edges may if desired be of circular or other desired section conforming with the shape of the blade in this region.

The holes as shown constitute a pattern adapted for maximum cooling effect but to control the blade metal temperature throughout the blade section the disposition of the holes may be varied as required, thus any or all of the holes may have their major axes inclined with respect to the blade camber line or some may be substantially parallel to it.

The supply of cooling air to the passageways is effected through drillings 52 in the shank portion 13. In an alternative arrangement a drilled passageway may be formed axially of the shank portion 13 to be supplied with air; such an axial passageway may be curved in order to communicate with the ends of the passageways, 17, 18, 19, 20 and 21 along a curved line corresponding approximately to the camber line B—B of FIGURE 4. The curved passageway may be formed as an arc about a centre remote from the shank portion 13 by an electrical drilling process involving the relative movement of the blade and a drill of circular arc formed about said centre.

I claim:
1. A blade of one piece of solid material for an internal combustion turbine engine comprising a blade portion profiled to airfoil cross-section having a concave surface and a convex surface, each of said surfaces being of decreasing curvature from root to tip and meeting in a leading edge and a trailing edge, a tip shroud on one end of the blade portion, a root fixing portion on the other end of said blade portion, a plurality of heat exchange passageways each of flattened elliptical cross-section extending axially through only said blade portion and tip shroud, said root fixing portion being solid, said blade portion having a median camber line the length of which increases progressively from blade tip toward the root, each of said passageways having its major axis of cross-section disposed at a substantial angle to the median camber line at any cross-section of the blade portion and of a length greater than the thickness of the profiled portion of the blade throughout a substantial part of the blade length, and said passageways being splayed with respect to each other to maintain substantially uniform distribution thereof along said camber line at all cross-sections of the blade.

2. The blade as defined in claim 1 having twist from root to tip and in which said passageways are also of such twisted form that the ends of their major transverse axes are nearly uniformly spaced from the said concave and convex surfaces throughout the length of the blade.

3. A blade as claimed in claim 1, wherein two of the passageways lie in the leading and trailing edges of the profiled portion of the blade, the major transverse axes of these two passageways lying substantially parallel to the median camber line.

References Cited in the file of this patent

UNITED STATES PATENTS

| 2,563,269 | Price _____ Aug. 7, 1951 |
| 2,830,357 | Tunstall _____ Apr. 15, 1958 |

FOREIGN PATENTS

| 737,479 | Germany _____ July 15, 1943 |
| 742,477 | Great Britain _____ Dec. 30, 1955 |
| 744,984 | Great Britain _____ Feb. 15, 1956 |
| 754,217 | Great Britain _____ Apr. 8, 1956 |
| 860,438 | Germany _____ Dec. 22, 1952 |
| 904,610 | Germany _____ Feb. 22, 1954 |
| 1,143,952 | France _____ Apr. 15, 1957 |